United States Patent
Antoine et al.

(10) Patent No.: US 6,917,795 B2
(45) Date of Patent: Jul. 12, 2005

(54) MULTI-CARRIER RECEIVER WITH IMPROVED RADIO FREQUENCY INTERFERENCE CANCELING

(75) Inventors: Philippe Antoine, Walhain (BE); Thierry Pollet, Mechelen (BE)

(73) Assignee: Alcatel, Paris (FR)

( * ) Notice: Subject to any disclaimer, the term of this patent is extended or adjusted under 35 U.S.C. 154(b) by 497 days.

(21) Appl. No.: 10/084,055

(22) Filed: Feb. 28, 2002

(65) Prior Publication Data

US 2002/0123321 A1 Sep. 5, 2002

(30) Foreign Application Priority Data

Mar. 1, 2001 (EP) ............................................ 01400548

(51) Int. Cl.⁷ .................................................. H04B 1/10
(52) U.S. Cl. ................. 455/296; 455/114.2; 455/168.1; 455/269; 455/271.1; 375/346
(58) Field of Search ................................ 455/296, 293, 455/323, 334, 339, 340, 269, 73, 75, 227, 77, 226.1, 82, 216, 552.1, 168.1, 575.7, 118, 101, 121, 104, 131, 114.2, 150.1, 309, 310, 311, 312, 313, 76, 67.13, 63.1, 115.1, 130, 136, 164.1; 348/731, 725; 725/151; 330/149, 151

(56) References Cited

U.S. PATENT DOCUMENTS

| | | |
|---|---|---|
| 5,479,447 A | 12/1995 | Chow et al. |
| 6,285,865 B1 * | 9/2001 | Vorenkamp et al. ........ 455/307 |
| 6,377,315 B1 * | 4/2002 | Carr et al. .................. 348/726 |
| 6,760,230 B2 * | 7/2004 | Kooker et al. .............. 361/753 |

FOREIGN PATENT DOCUMENTS

| | | |
|---|---|---|
| WO | WO 97/40609 A1 | 10/1997 |
| WO | WO 99/26365 A1 | 5/1999 |

OTHER PUBLICATIONS

Bingham J A C: "RFI Suppression in Multicarrier Transmission Systems" Phoenix, May 4–7, 1997, New York, IEEE, US, vol. CONF. 47, Nov. 18, 1996, pp. 1026–1030, XP000741584.

Clercq De L et al.: "Mitigation of Radio Interference in XDSL Transmission" IEEE Communications Magazine, IEEE Service Center. Piscataway, N.J., US, vol. 38, No. 3, Mar. 2000, pp. 168–173, XP000948537.

Spruyt P et al.: "Solving the issue of radio interference when deploying digital subscriber lines", NOC '97, Broadband Access Networks, Jun. 17–19, 1997, pp. 98–105, XP002940575.

* cited by examiner

Primary Examiner—Edward F. Urban
Assistant Examiner—Thuan Nguyen
(74) Attorney, Agent, or Firm—Sughrue Mion, PLLC

(57) ABSTRACT

A multi-carrier receiver selects antennas (A31, A32), i.e. carriers whereto a small amount of power and data is allocated, for estimation of characteristics of a narrowband disturber (RFI-Signal-3) in the Radio Frequency Interference band (RFI-Band), a predetermined band for e.g. radio amateur transmission. These antennas (A31, A32) can be selected amongst all carriers located inside the Radio Frequency Interference band (RFI-Band) and at least two carriers (C1, C2) located outside the Radio Frequency Interference band (RFI-Band).

4 Claims, 2 Drawing Sheets

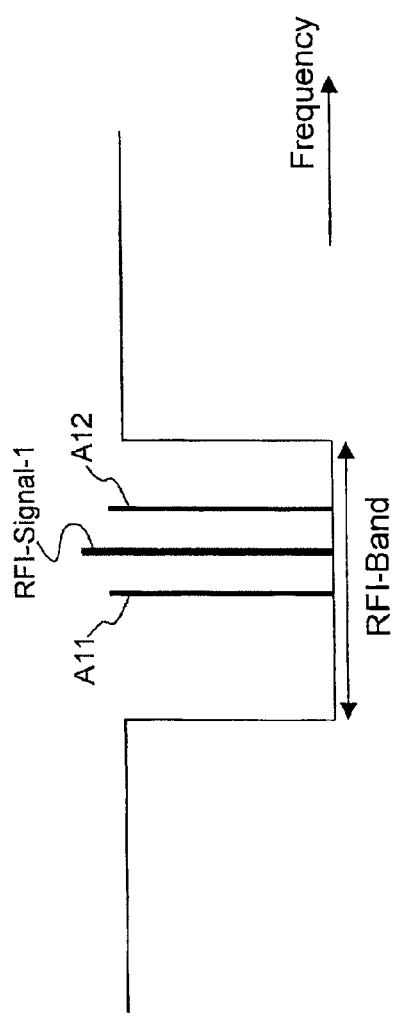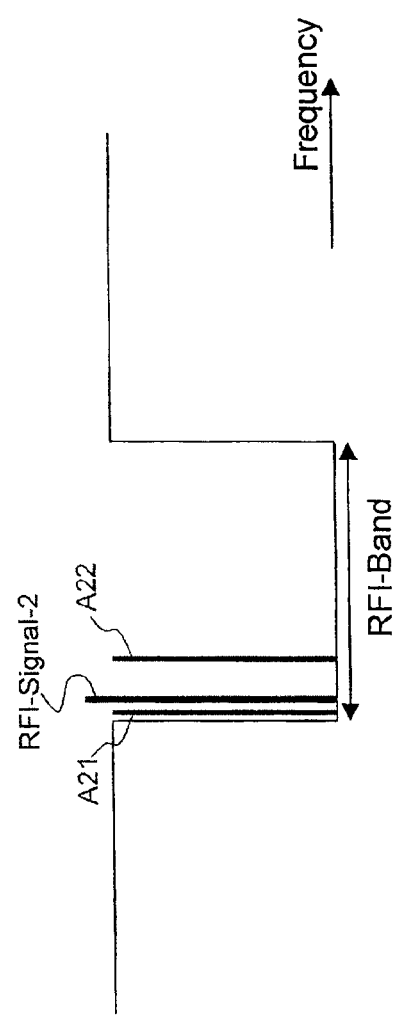

MULTI-CARRIER RECEIVER WITH IMPROVED RADIO FREQUENCY INTERFERENCE CANCELING

BACKGROUND OF THE INVENTION

The present invention relates to a multi-carrier receiver.

Such a multi-carrier receiver is already known in the art, e.g. from the article 'Mitigation of radio Interference in xDSL Transmission' from the authors Luc de Clercq, Miguel Peeters, Sigurd Schelstraete and Thierry Pollet. This article has been published in IEEE Communications Magazine, March 2000, pag. 168–173. The DMT (Discrete Multi Tone) receiver drawn in FIG. 3 of this article and described on page 172 in the paragraph entitled 'Digital RFI Canceling' receives a multi-carrier DMT signal and demodulates digital data contained in DMT symbols from the set of carriers constituting the multi-carrier DMT signal. In order not to disturb radio amateur transmission, the PSD (Power Spectral Density) of the multi-carrier DMT signal stays below a certain maximum value within predetermined, standardised frequency bands: the so called RFI (Radio Frequency Interference) bands listed in table 1 of the cited article. A radio amateur signal or narrowband interferer transmitted within this RFI band can disturb receipt of the multi-carrier DMT signal, even outside the RFI band. Indeed, harmonics (sidelobes) of the radio amateur signal can affect the carriers of the DMT signal located outside the RFI band so that proper demodulation of the bits modulated on these carriers is no longer possible without additional measures. For this reason, the known DMT receiver estimates the characteristics of a narrowband disturber in the RFI band. These characteristics generally speaking are parameters of the RFI model that have to be estimated. If for the sake of simplicity it is supposed that the narrowband disturber is a sine or cosine shaped signal (the sine or cosine model in practice is not used but gives an indication why two parameters can be considered), the amplitude and phase are for instance two characteristics that can be estimated. To estimate these characteristics, the known DMT receiver selects antennas within the RFI band. An antenna is a reserved carrier out of the set of carriers that constitute the DMT signal, whereto no or a substantially low amount of power and data bits are assigned. All carriers within the RFI band are candidate antennas because the PSD (Power Spectral Density) of the multi-carrier DMT signal anyhow has to stay low in the RFI band, e.g. −80 dB/Hz for aerial wires (strong coupling PSD) and −60 dB/Hz for buried wires (weak coupling PSD) according to standard specifications. By sensing the signals received at the frequencies of the antennas, the multi-carrier receiver can determine characteristics of the narrowband disturber. This is explained at page 172 of the cited IEEE publication, right column, second paragraph.

The location of the antennas relative to the RFI signal frequency is critical for the estimation of the RFI signal characteristics. In case the narrowband disturber is located e.g. near an edge of the RFI band, the prior art DMT receiver cannot estimate the characteristics of the narrowband disturber accurately, because the two antennas cannot be located optimally. One of these antennas has to be selected too close to the RFI disturber, or both antennas have to be chosen at the same side of the RFI disturber.

A consequence of the operation of the known DMT receiver is loss of minimum guaranteed capacity. This minimum guaranteed capacity is the capacity (measured in bits per second received) in the worst case scenario. This worst case scenario corresponds to a situation where the narrowband disturber is located at an edge of the RFI band, because the harmonics of the narrowband disturber then affect the carriers out of the RFI band most strongly. In particular in this worst case situation, the prior art DMT receiver fails to accurately determine the characteristics of the narrowband disturber so that the disturbing effects thereof cannot be compensated for optimally.

SUMMARY OF THE INVENTION

An object of the present invention is to provide multi-carrier receiver similar to the known one, but which is able to estimate the characteristics of a narrowband disturber in the standardised RFI band accurately, irrespective of the location of this narrowband disturber in the RFI band, and whose minimum guaranteed capacity is increased.

Indeed, the antennas no longer have to be chosen exclusively within the RFI band, but alternatively may be chosen amongst the carriers in the RFI band and at least two carriers located outside the RFI band. In case the narrowband interferer is not optimally located, i.e. near to an edge of the RFI band, one antenna can be selected inside the RFI band and a second antenna can be chosen outside the RFI band so that the two antennas are located at opposite sides of the narrowband disturber and at sufficient distance thereof in order to allow an accurate estimation of the characteristics of the narrowband disturber. Since the characteristics of a narrowband disturber in the worst case situation where this narrowband disturber is located at an edge of the RFI band can be estimated more accurately according to the present invention, the effects of the worst case narrowband disturber can be compensated for more optimally resulting in an increased minimum guaranteed capacity.

A minor disadvantage of the multi-carrier receiver according to the present invention is that its maximum achievable capacity is lower than that of the known DMT receiver because at least two carriers outside the RFI band are set to zero (no or small amount of power and data bits allocated thereto). The maximum achievable capacity however is a less relevant parameter than the minimum guaranteed capacity for multi-carrier transmission systems like DMT (Discrete Multi Tone) based ADSL (Asynchronous Digital Subscriber line) or VDSL (Very High Speed Digital Subscriber Line) transmission. Moreover, the relative decrease of the maximum achievable capacity through implementation of the present invention gets smaller in systems with a high number of carriers such as VDSL systems (because the number of carriers to be set zero remains two), whereas the increase of the minimum guaranteed capacity gets higher in systems with a high number of carriers (because a higher number of carriers is affected in the worst case situation if the prior art solution is applied).

It is to be noticed that the term 'comprising', used in the claims, should not be interpreted as being limitative to the means listed thereafter. Thus, the scope of the expression 'a device comprising means A and B' should not be limited to devices consisting only of components A and B. It means that with respect to the present invention, the only relevant components of the device are A and B.

Thus, in systems where the amount of power and data bits assigned to each carrier is determined by the receiver, the receiver itself can reserve at least two carriers outside the RFI band that may be selected later on as antenna for estimation of the characteristics of the RFI disturber, by assigning a low amount of power and data bits to these carriers. This is for instance the situation in ADSL systems or VDSL systems, wherein the receiver determines the amount of power and data bits to be allocated to each carrier and communicates these amounts to the transmitter via the so called BiGi-information.

In this way, the minimum amount of carriers (which is two) is set to zero outside the RFI band, and the antennas can always be chosen at opposite sides of the RFI disturber irrespective of which edge of the RFI band the narrowband disturber is laying near.

In this way, the selection of the carriers that may be used as antennas is optimal for an RFI signal located exactly at the edge of the RFI band, i.e. the worst case situation.

BRIEF DESCRIPTION OF THE DRAWINGS

The above mentioned and other objects and features of the invention will become more apparent and the invention itself will be best understood by referring to the following description of an embodiment taken in conjunction with the accompanying drawings, wherein:

FIG. 1 represents a frequency diagram illustrating the operation of the known multi-carrier receiver in case the RFI disturber RFI-Signal-1 is optimally located, i.e. in the middle of the RFI band;

FIG. 2 represents a frequency diagram illustrating the operation of the known multi-carrier receiver in case the RFI disturber RFI-Signal-2 is sub-optimally located, i.e. near an edge of the RFI band.

DETAILED DESCRIPTION OF EMBODIMENTS

Figure 3:
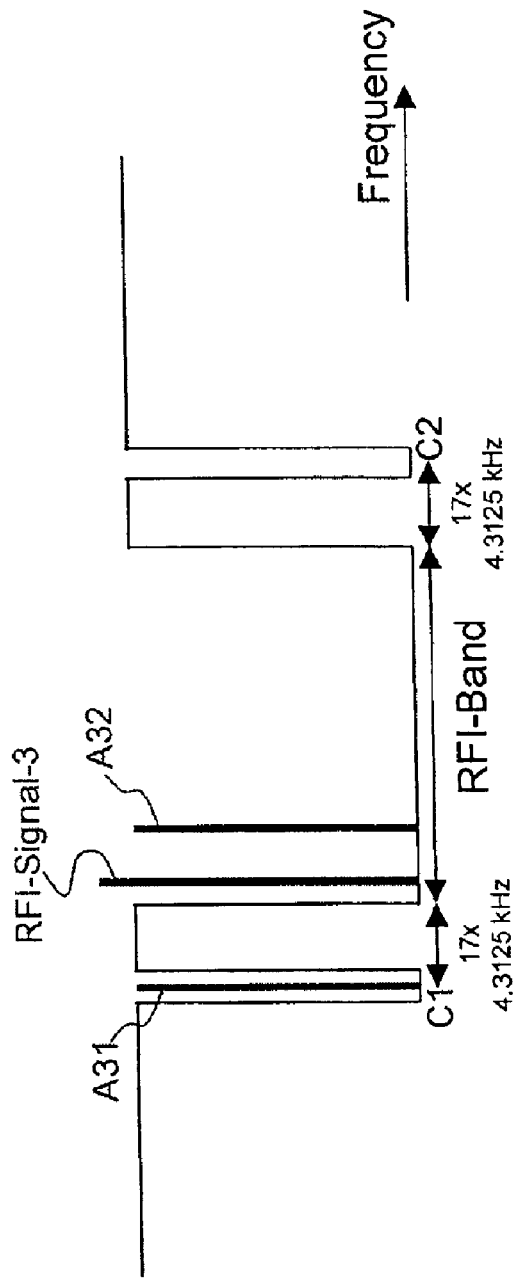
FIG. 3 represents a frequency diagram illustrating the operation of an embodiment of the multi-carrier receiver according to the present invention in case the RFI disturber RFI-Signal-3 is sub-optimally located, i.e. near an edge of the RFI band.

FIG. 1 illustrates the operation of a prior art multi-carrier receiver. The receiver receives a multi-carrier signal containing for instance 1024 carriers modulated with digital data. The interspacing between two carriers equals 4.3125 kHz. Part of the carriers have frequencies inside the Radio Frequency Interference band, RFI-Band in FIG. 1. This RFI-Band is a predetermined, standardised frequency interval reserved for e.g. radio amateur transmission. To avoid disturbance of the radio amateur emission in the RFI-Band, the power spectral density of the multi-carrier signal within this RFI-Band should be −80 dB/Hz or −60 dB/Hz. This is drawn in FIG. 1, and implies that only a very limited amount of power and data bits can be allocated to the carriers having frequencies within this RFI-Band. The prior art multi-carrier receiver contains circuitry and software to roughly determine the location of a narrowband disturber RFI-Signal-1, e.g. a radio amateur signal, in the RFI-Band. Thereupon, the prior art multi-carrier receiver selects two carriers having frequencies inside the RFI-Band to act as antennas, A11 and A12. The receiver senses the level of the signal received at the frequencies of the antennas A11 and A12, and with this information estimates the characteristics of the narrowband disturber RFI-Signal 1. An accurate estimation of the characteristics of the narrowband disturber, RFI-Signal-1, enables the multi-carrier receiver to compensate for the effects of the disturber. This is important, in particular because the tail of the narrowband disturber which is due to harmonics, might affect the carriers outside the RFI-Band that carry large amounts of data bits. In case the antennas A11 and A12 are chosen close to the narrowband disturber RFI-Signal-1, the characteristics of the peak of the narrowband disturber can be estimated accurately, but the tail cannot be estimated accurately. If on the other hand the antennas A11 and A12 are chosen far away from the narrowband disturber RFI-Signal-1, the effect of the narrowband disturber RFI-Signal-1 at the frequency of the antennas may stay below the noise level, so that the receiver senses the noise instead of the disturbance coming from RFI-Signal-1. The location of the antennas A11 and A12 relative to the frequency of the narrowband disturber RFI-Signal-1 is thus critical. For a narrowband disturber RFI-Signal-1 that is located optimally, i.e. in the middle of the RFI-Band like is drawn in FIG. 1, the prior art receiver can always select a pair of antennas, A11 and A12, that enable an accurate estimation of the characteristics of the narrowband disturber. For a narrowband disturber RFI-Signal-2 that is located sub-optimally, i.e. near an edge of the RFI-Band as is drawn in FIG. 2, the prior art receiver has to select one antenna A21 close to the narrowband disturber RFI-Signal-2, or has to select the two antennas on one side of the narrowband disturber RFI-Signal-2. Both choices do not enable the receiver to accurately estimate and compensate for the RFI disturber RFI-Signal-2. As a consequence, the minimum guaranteed capacity decreases as already explained in the introductory part of this patent application.

FIG. 3 illustrates the working of a multi-carrier system according to the present invention. Apart from the carriers having frequencies in RFI-Band, two other carriers C1 and C2 are kept zero. This means that no data bits and no power is allocated to the carriers C1 and C2, although these carriers do not have frequencies within the RFI-Band. Carrier C1, as is denoted in FIG. 3, is located at a frequency 17 times 4.3125 kHz below the lower edge of the RFI-Band, whereas carrier C2 is located at a frequency 17 times 4.3125 kHz above the upper edge of the RFI-Band. The receiver according to the present invention again contains circuitry or software to roughly estimate the location of a narrowband disturber RFI-Signal-3. If this narrowband disturber RFI-Signal-3 is located near the lower edge of the RFI-Band, like is depicted in FIG. 3, the multi-carrier receiver according to the present invention selects carrier C1 as the first antenna and another carrier A32 inside the RFI-Band as second antenna for estimating the characteristics of the narrowband disturber RFI-Signal-3. If the narrowband disturber would be located in the middle of the RFI-Band, the multi-carrier receiver will select the two antennas within the RFI-Band, similar to the situation depicted in FIG. 1 for the prior art multi-carrier receiver. In case the narrowband disturber has a peak frequency close to the upper edge of the RFI-Band, the multi-carrier receiver will select a first antenna within the RFI-Band and will select carrier C2 as second antenna. Once the antennas are selected, the procedure or algorithm used for determining the characteristics of the narrowband disturber could be manifold, depending on the application and assumptions made.

It is noticed that applicability of the present invention is not limited to multi-carrier receivers which also have the capability to assign amounts of power and data bits to the different carriers. In an ADSL (Asymmetric Digital Subscriber Line) or VDSL (Very High Speed Digital Subscriber Line) environment, this is the responsibility of the receiver, but any person skilled in the art can imagine that assigning bits and gains to individual carriers could also be the responsibility of the transmitter, a unit separated from the transmitter and receiver, or could even be predetermined by a standard specification. The concept of selecting the antennas at the receiver amongst carriers inside the RFI-Band and at least two carriers outside the RFI-Band can be implemented irrespective of the location of the functionality that assigns bits and gains.

It is also remarked that applicability of the concept according to the present invention is not limited to a particular modulation type such as DMT (Discrete Multi Tone), Zipper, OFDM (Orthogonal Frequency Division Multiplexing), . . . or to a particular application such as ADSL, VDSL. The present invention provides an advantageous solution to cope with narrowband interferers in any multi-carrier transmission system without drastically affecting the minimum guaranteed capacity.

A further remark is that the functionality to select the antennas for estimating RFI characteristics may be implemented in hardware, in software, or partially in hardware and partially in software. The precise algorithm or selection criteria for the antennas can be manifold, but since the inventive nature of the present invention is not in the criteria used for selecting the antennas, this aspect is not further deepened in this patent application.

While the principles of the invention have been described above in connection with specific apparatus, it is to be clearly understood that this description is made only by way of example and not as a limitation on the scope of the invention.

What is claimed is:

1. A multi-carrier receiver adapted to receive a multi-carrier signal and to demodulate data symbols from a set of carriers that constitute said multi-carrier signal, said multi-carrier receiver comprising an antenna selector selecting at least two carriers as antennas for estimation of characteristics of a narrowband disturber:

wherein said antenna selector is adapted to select said at least two antennas amongst all carriers located inside a predetermined frequency band wherein a power spectral density of said multi-carrier signal has to stay below a threshold value, and at least two carriers located outside said predetermined frequency band.

2. A multi-carrier receiver according to claim 1, wherein said multi-carrier receiver further comprises antenna reservation means, adapted to reserve said at least two carriers located outside said predetermined frequency band by assigning a substantially low amount of power and data bits to said at least two carriers.

3. A multi-carrier receiver according to claim 1, wherein said at least two carriers are located at an equal distance from respective edges of said predetermined frequency band.

4. A multi-carrier receiver according to claim 3, wherein said distance equals 17 times 4.3125 kHz.

* * * * *